United States Patent Office 2,777,831
Patented Jan. 15, 1957

2,777,831

PROCESSABLE, STORABLE, ISOCYANATE-MODIFIED POLYESTERS

Nelson V. Seeger, Silver Lake, and Thomas G. Mastin, Akron, Ohio, assignors, by mesne assignments, to The Goodyear Tire & Rubber Company, a corporation of Ohio No Drawing. Application August 22, 1952,
Serial No. 305,914

18 Claims. (Cl. 260—75)

This invention relates to synthetic polymeric materials and to methods for preparing the same. More particularly, it relates to organic diisocyanate-modified polyesters and polyesteramides which possess elastomeric, rubber-like qualities and to improved methods for their preparation.

The modifying of linear polyesters and polyesteramides with organic diisocyanates is known in the art. The polyesters are formed by the condensation of a dibasic carboxylic acid with a glycol. The polyesteramides are formed by the condensation of a dibasic carboxylic acid with a mixture of a glycol and an amino bearing compound such as an amino alcohol and/or a diamine. The condensation reaction proceeds with the elimination of water to yield a linear polyester or polyesteramide which is usually viscous, syrupy, or wax-like at room temperature.

As is determined by the materials and amounts thereof used in its formation, the polyester or polyesteramide may contain terminal carboxyl, hydroxyl, or amino groups depending upon whether an acid, a glycol, an amino alcohol, or a diamine was the last compound to react in the formation of the linear molecule. The polyester or polyesteramide is then lengthened further by the reaction between these terminal groups and an organic diisocyanate with the formation of what may be referred to as a "chain-extended" polymer. The linkages formed by the reaction of the terminal groups of the polyester with the diisocyanate are a urethane linkage

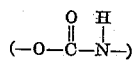

in the case of a terminal —OH group, principally an amide linkage

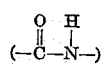

in the case of a terminal —COOH group, and a substituted urea linkage

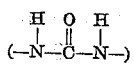

in the case of a terminal —NH₂ group. Since each of these linkages and, in the case of polyesteramides, the amide groups, contain hydrogen available for reaction with additional diisocyanate, it is possible to cross link the chain-extended polymer at various points along its chain.

Depending upon many variables in their preparation, the diisocyanate-modified polymers will vary considerably in their physical characteristics to include soft wax-like materials, elastomeric rubber-like materials, hard fiber-forming materials, tough leather-like materials, and hard infusible resinous materials. The rubber-like materials fit in between the soft wax-like materials and the tough leather-like materials, and will be discussed at greater length below.

The organic diisocyanate-modified polyesters and polyesteramides which possess rubber-like properties have, up until the present invention, exhibited certain properties which make their use as synthetic rubbers impractical and undesirable. In particular, the known "rubber-like" compositions have not possessed that degree of processibility required in the fabrication of rubber or rubber-like products. In addition, the known compositions have "cured" or "set up" in a relatively short time after their preparation, with the result that the "uncured" material cannot be stored for indefinite periods between the time it is prepared and the time it is used. It is therefore an object of this invention to provide a method for the preparation of highly elastic organic diisocyanate-modified polyesters and polyesteramides which possess processing qualities similar to those of uncured natural rubber and which may be stored in the uncured state over long periods of time without hardening or curing. It is a particular object of this invention to provide organic diisocyanate-modified polyesters and polyesteramides which possess not only processing and aging characteristics similar to those of uncured natural rubber but also outstanding physical properties in the final vulcanized state. Still another object of this invention is to provide a method for the curing of these processible, storable, modified polyesters and polyesteramides. Other objects will appear as the description proceeds.

According to the invention it has been found that there are several critical limitations and requirements in the preparation of the polyester or polyesteramide itself, the chemical nature of the linkages formed between the diisocyanate and the terminal groups of the polyester or polyesteramide, and the type and amount of diisocyanate used to chain-extend and possibly cross-link the polyester or polyesteramide, all of which limitations and requirements must be met in order to produce a rubber-like material which has the desired processing and aging properties in the uncured state and valuable physical properties in the final cured state.

The unmodified polyester is prepared in its simplest form from two bifunctional ingredients, one being a dibasic carboxylic acid and the other being a glycol. The particular polyesteramides, with which this invention is concerned, are those formed from the reaction of a dibasic carboxylic acid with a mixture comprising a glycol and an amino alcohol or a diamine. In addition, a wide variety of complex polyesters and polyesteramides may be formed by the reaction of a plurality of acids, glycols, amino alcohols, or diamines. In the preparation of polyesters, it is possible to use ester mixtures such as a physical mixture of ethylene adipate and 1,2-propylene adipate as well as mixed esters such as that resulting from the reaction of a mixture of ethylene glycol and 1,2-propylene glycol with adipic acid. The reaction proceeds with the elimination of water to yield a long chain molecule containing a succession of ester or esteramide groups in the chain. The ester and esteramide groups may be illustrated by the following radicals:

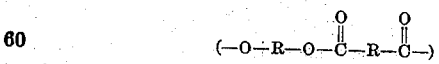
from a glycol,

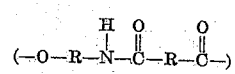
from an amino alcohol,

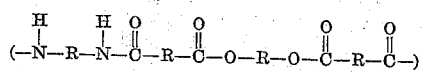

from a glycol and a diamine. R in all instances denotes a divalent organic radical such as a hydrocarbon radical. In the preparation of the polyester or polyesteramide it is possible to obtain products of varying molecular weight, depending in part upon the molecular weight of the reactants and in part upon the degree of polymerization of the reactants or the number of ester or esteramide units in the polyester or polyesteramide chain. While the average molecular weight of the polyester or polyesteramide will of course vary depending upon the particular acids, glycols, amino alcohols and diamines used, it has now been found that the average number of these ester and esteramide groups present in the polyester or polyesteramide chain must be held within certain limits in order to permit the subsequent modification with diisocyanate to yield a processible, storable polymer. A convenient method of measuring the degree of polymerization of the polyester or polyesteramide is to determine the average number of carboxyl, hydroxyl, and amino groups in a given amount of the linear-extended polyester or polyesteramide. The acid number (milligrams of KOH per gram of polyester or polyesteramide using phenolphthalein as an indicator) is a measure of the number of terminal carboxyl groups in the polyester or polyesteramide. The hydroxyl number, which is a measure of the number of terminal hydroxyl and amino groups taken together, is determined by adding pyridine and acetic anhydride to the polyester or polyesteramide and titrating the acetic acid formed with KOH as described in Ind. Eng. Chem. Anal. Ed. 16, 541-49 and in Ind. Eng. Chem. Anal. Ed. 17, 394 (1945). The hydroxyl number is defined as milligrams of KOH per gram of polyester or polyesteramide. The sum of the acid number and hydroxyl number, which will be referred to as the reactive number, is an indication of the average number of terminal groups present in the polyester or polyesteramide which in turn is an indication of the number of molecules in the mass and the degree of polymerization. A polyester or polyesteramide containing long chain molecules will have a relatively low reactive number, while a polyester or polyesteramide containing short-chain molecules will possess a higher reactive number.

According to the practice of the present invention, a rubber-like polymer is produced from a polyester or polyesteramide having a reactive number from 30 to 152. In preferred practice a polyester or polyesteramide having a reactive number from 50 to 65 is used. In addition, for the purposes of this invention, the acid number in excess of 12 will produce diisocyanate-modified a maximum of 12, and preferably to a maximum of 5, since polyesters or polyesteramides having an acid number in excess of 12 will produce diisocyanate-modified polymers which are too tough to process satisfactorily. The acid number is conveniently controlled by providing an approximate 20 mol percent excess of glycol, amino alcohol, or diamine in the preparation of the polyester or polyesteramide.

The number of hydrogen-bearing amino groups in the polyesteramides is an additional critical feature applying to the preparation of rubber-like diisocyanate-modified polyesteramides. It has been found that polyesteramides produced from amino alcohols or diamines do not yield processible polymers when modified with certain diisocyanates if the number of $-NH_2$ groups present in the reacting mixture exceeds 30% of the total number of hydrogen-yielding groups present in the reacting mixture. This, in effect, means that where amino alcohols are used, the maximum amount permissible is 60 mol percent, the other 40 mol percent being a glycol. In the case of diamines, a maximum of 30 mol percent is permissible. In the case of mixtures of glycols, amino alcohols, and diamines, the number of $-NH_2$ groups present must be limited to a maximum of 30% of the total $-NH_2$ and $-OH$ groups present.

According to the invention, it has also been discovered that the preparation of a processible, storable diisocyanate-modified polyester or polyesteramide involves a critical limitation in the particular diisocyanates and amounts thereof which may be used. It has been set forth above that the nature of the modified polymer will depend upon the amount of diisocyanate used to chain-extend and cross-link the polyester. It has now been discovered that the production of a processible, storable rubber-like polymer depends upon the determination of the critical amounts of diisocyanate to be used. It has also been discovered that this cirtical amount of diisocyanate depends upon which specific diisocyanate is employed to modify the polyester or polyesteramide.

The particular diisocyanates with which this invention is concerned are the tolylene diisocyanates such as 2,5-tolylene diisocyanate and particularly the meta tolylene diisocyanates, such as 2,6-tolylene diisocyanate; 3,5-tolylene diisocyanate and preferably 2,4-tolylene diisocyanate or mixtures thereof such as mixtures of the 2,4- and 2,6-isomers. For the purposes of this invention these diisocyanates must be used in an amount ranging from 0.85 to 1.10 mols per mol of polyester or polyesteramide. A preferred range is from .90 to 1.00 mol of diisocyanate per mol of polyester or polyesteramide while optimum results are obtained in a range from 0.94 to 1.00. Amounts smaller than 0.85 mol will produce soft, sticky polymers which will not process satisfactorily in the usual rubber fabricating operations. Amounts greater than 1.10 mols produce tough polymers which will not process satisfactorily and which will harden or cure upon aging. It is possible to use a mixture of tolylene diisocyanates in the preparation of the rubber-like polyesters and polyesteramides so long as the total amount of diisocyanate used falls within the range indicated. While certain other diisocyanates will not produce the desired results if used in an amount covered by the critical range specified, it is to be understood that the tolylene diisocyanates are not necessarily the only diisocyanates which are operative for the purposes of this invention but rather represent those which produce the desired results when employed in an amount falling within the critical range indicated.

After the processible storable polymer has been formed, it is prepared for curing by adding more diisocyanate or other conventional curing materials such as alkyl ethers of hexamethylol melamine with a 2,4-dihalo naphthol as accelerator. Polyisocyanates, such as 4,4′,4″-triisocyanto triphenyl methane, 1,3,5-triisocyanto benzene, and 2,4,6-triisocyanto toluene, may also be used to effect a cure. Any organic diisocyanate, polyisocyanate or mixtures of diisocyanates, polyisocyanates, or both may be added in this step. It may be the same or a different diisocyanate than that used in the formation of the processible polymer, or it may be a diisocyanate other than those listed. A convenient method of adding the tolylene diisocyanate to be used either in the formation of the chain-extended polymer or as a curing agent, is in the form of one of its dimers such as the dimer of 2,4-tolylene diisocyanate of the following formula:

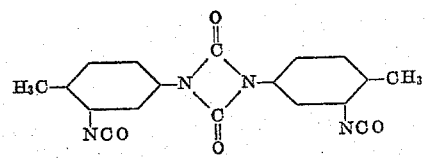

The dimer is less toxic than the monomeric material, permitting the use of the dimer in open-mill mixing. The amount of polyisocyanate added to effect a cure must be controlled so as to provide a total number of $-NCO$ equivalents, including that added in the formation of the processible polymer, ranging from 2.80 to 3.20 equivalents of $-NCO$ per mole of polyester or polyesteramide. Smaller amounts of polyisocyanate added to cure the polymer will result in an under cured product. The use of greater amounts is a waste of material with no improved properties in the cured product, and in some cases produces a cured polymer having properties more resinous than rubber-like.

If a triisocyanate or tetraisocyanate is used to effect a cure, not as much material, on a mol basis, need be used since the curing or cross-linking of the linear molecules depends upon the —NCO groups present in the curing agent. For example, if 0.40 mol of a diisocyanate gives a satisfactory cure of a diisocyanate-modified polyester or polyesteramide, the use of approximately 0.20 mol of a tetraisocyanate will result in a similar state of cure.

The actual curing of the polymer is accomplished by methods familiar to those skilled in the art. The time and temperature required to effect the best cure for any particular polymer will, of course, vary as is the case with conventional natural rubber compounds. The cure, for best results, should be accomplished by the use of dry heat since exposure of the polymer to hot water or steam results in a partial degeneration of the cured material.

The following examples, in which parts are by weight, are illustrative of the preparation of the polyester and polyesteramides and of the diisocyanate-modified polyester and polyesteramides according to the teachings of this invention.

EXAMPLE 1

Preparation of a typical polyester

Adipic acid (3515 parts) was placed in a 5 liter, 3-necked flask fitted with a stirrer, thermo-couple well, gas inlet tube, distilling head, and condenser. To the acid were added 1064 parts of ethylene glycol and 869 parts of propylene 1,2 glycol. The molar ratio of dibasic acid to glycol is 1:1.19. The mixture was heated to 130–160° C. until most of the water had distilled off. The temperature was then gradually raised to 200° C., the pressure being gradually reduced to 20 mm. and nitrogen being bubbled through the melt. After 23½ hours a soft white waxy solid was obtained. Determinations showed the acid number to be 3.5 and the hydroxyl number to be 58.6.

EXAMPLE 2

Preparation of the diisocyanate-modified polymer

A quantity of polyester was prepared from adipic acid, ethylene glycol, and propylene 1,2 glycol according to the general method and in substantially the same ratios as shown in Example 1. This polyester had an acid number of 3.1 and a hydroxyl number of 55.6. After heating 200 parts of this polyester to 120° C. in an iron kettle, 2,4-tolylene diisocyanate (20.11 parts of 99.7% purity or 1.10 mols of diisocyanate per mol of polyester) was added. After 15 minutes of mixing, the material was poured into a waxed aluminum tray and baked for 8 hours at 120° C. The resulting polymer had excellent processing characteristics on a rubber mill.

EXAMPLE 3

Preparation of cured polymer

The diisocyanate-modified polymer (100 parts) prepared according to Example 2 was mixed with 5.52 parts of 4,4'-diphenyl diisocyanate on a rubber mill, bringing the total amount of diisocyanate present in the cured compound to 1.59 mols per mol of polyester. Test sheets cured for 60 minutes at 300° F. showed the following physical properties:

Tensile _____ 2600 pounds per square inch.
Elongation _____ 710%.
300% modulus _____ 300 pounds per square inch.

Table I shown below tabulates selected examples of polyesters and diisocyanate-modified polyesters which were prepared according to the practices of this invention and according to the general procedure outlined in Examples 1 and 2.

TABLE I

| Example | Polyester | Hydroxyl No. | Acid No. | Diisocyanate | R Value [1] | Rating |
|---|---|---|---|---|---|---|
| 4 | A | 55.6 | 3.1 | A' | 1.0 | Excellent. |
| 5 | A | 55.6 | 3.1 | A' | 1.1 | Good. |
| 6 | A | 61.8 | 2.1 | A' | 0.99 | Excellent. |
| 7 | A | 53.5 | 2.2 | A' | 0.95 | Do. |

Polyester A—80 mol percent ethylene glycol, 20 mol percent propylene 1,2-glycol, 100% adipic acid.
Diisocyanate A'—2,4-tolylene diisocyanate.
[1] Mols of diisocyanate per mol of polyester.

The rating indicated for each polymer is based upon its behavior on a rubber mill in relation to its processibility on the mill and on other rubber fabricating equipment. The polymers described in Table I have been found to age at room temperature for long periods of time with little or no apparent change in their processing characteristics.

In addition to the specific materials shown in the experimental examples, a variety of other acids, glycols, amino alcohols and diamines may be used. Any dibasic carboxylic acid containing at least 3 carbon atoms, and preferably those whose carboxyl groups are attached to terminal carbons, may be used to form the polyester or polyesteramide, including succinic, glutaric, adipic, pimelic, suberic, azelaic, sebacic, malonic, brassylic, tartaric, maleic, malic, fumaric, dilinoleic, thiodibutyric, diphenic, isophthalic, terephthalic, hexahydroterephthalic, p-phenylene diacetic, dihydromuconic, and B-methyladipic acids. For best results the unsaturated acids should be used in mixture with a saturated acid in an amount not to exceed 5 mol percent of the mixture. The presence of a small amount of unsaturation in the polyester or polyesteramide is often desirable if cheaper curing or cross-linking agents such as for example, sulfur, benzoyl peroxide, or tertiary butyl hydroperoxide are to be used. Higher degrees of unsaturation in the polyester or polyesteramide result in cured polymers which do not have the outstanding physical properties possessed by the polymers produced from polyesters or polyesteramides containing no unsaturation or a relatively small amount of unsaturation.

Any glycol may be used in the formation of the polyesters or polyesteramides including ethylene, propylene 1,2, propylene 1,3, diethylene, triethylene, tetramethylene, pentamethylene, hexamethylene, decamethylene, dodecamethylene, and N,N-diethanolaniline.

Any amino alcohol having at least one hydrogen atom attached to the amino nitrogen atom may be employed including ethanolamine, 3-amino-propanol, 4-amino-butanol, 6-amino-hexanol, 10-amino-decanol.

Examples of the diamines which may be used are ethylene, propylene 1,2, propylene 1,3, tetramethylene 1,4, hexamethylene 1,6, decamethylene 1,10, the tolylene diamines, piperazine, isopropyl aminopropyl amine, 4,4'-diamino diphenyl methane, and 3,3' diamino dipropyl ether.

In addition to the examples already shown, listed below are the reactants which are used to form particular polyesters and polyesteramides which when modified with diisocyanate according to the practice of this invention will produce processible, storable polymers.

1. Ethylene glycol plus adipic acid.
2. Propylene glycol 1,2 plus adipic acid.
3. Ethylene glycol (80 mol percent), propylene glycol 1,2 (20 mol percent) plus adipic acid.
4. Ethylene glycol (80 mol percent), propylene glycol 1,2 (20 mol percent) plus azelaic acid.
5. Ethylene glycol (80 mol percent), propylene glycol 1,2 (20 mol percent) plus sebacic acid.
6. Ethylene glycol (80 mol percent), propylene glycol 1,2 (20 mol percent) plus dilinoleic acid (20 mol percent), adipic acid (80 mol percent).

7. Ethylene glycol (80 mol percent), glycerine monoethyl ether (20 mol percent) plus adipic acid.
8. Ethylene glycol (80 mol percent), butylene glycol 1,4 (20 mol percent) plus adipic acid.
9. Ethylene glycol (80 mol percent), propylene glycol 1,3 (20 mol percent) plus adipic acid.
10. Ethylene glycol (80 mol percent), pentane diol 1,5 (20 mol percent) plus adipic acid.
11. Ethylene glycol (80 mol percent), glycerine monoisopropyl ether (20 mol percent) plus adipic acid.
12. Ethylene glycol (80 mol percent), propylene glycol 1,2 (from 18 to 5 mol percent), ethanol amine (from 2 to 15 mol percent) plus adipic acid.
13. Ethylene glycol (80 mol percent), propylene glycol 1,2 (20 mol percent) plus maleic acid (from 3 to 6 mol percent), adipic acid (from 97 to 94 mol percent).
14. Ethylene glycol (80 mol percent), propylene glycol 1,2 (from 19 to 17 mol percent), piperazine (from 1 to 3 mol percent) plus adipic acid.
15. Ethylene glycol (80 mol percent), propylene glycol 1,2 (from 18 to 5 mol percent), dihydroxyethyl aniline (from 2 to 15 mol percent) plus adipic acid.
16. Ethylene glycol (80 mol percent), diethylene glycol 20 mol percent) plus adipic acid.
17. Ethylene glycol (from 90 to 10 mol percent), propylene glycol, 1,2 (from 10 to 90 mol percent) plus adipic acid.
18. Ethylene glycol (from 90 to 10 mol percent), propylene glycol 1,2 (from 10 to 90 mol percent) plus azelaic acid.

Any of the above materials will produce polyesters or polyesteramide which when prepared and treated according to the practice of this invention will yield processible, storable polymers after reaction with any of the tolylene diisocyanates.

Of particular interest are the rubber-like polymers resulting from (1) polyethylene adipate modified by at least one tolylene diisocyanate, (2) polypropylene 1,2 adipate modified by at least one tolylene diisocyanate, (3) polyethylene (80 mol percent) propylene 1,2 (20 mol percent) adipate modified by at least one tolylene diisocyanate, (4) polyethylene (80 mol percent) propylene 1,2 (20 mol percent) azelate modified by at least one tolylene diisocyanate, and (5) polyethylene (80 mol percent) propylene 1,2 (from 19 to 17 mol percent) piperazine (from 1 to 3 mol percent) adipate modified by at least one tolylene diisocyanate.

The elastomeric polymers prepared according to the practices of this invention are, in general, useful in those applications where natural rubber or rubber-like materials are used. In particular they may be used in tires, belts, hose, sheet packing, gaskets, molded goods, floor mats, dipped goods, sheeting, tank lining, soles, heels, covered rolls, and other mechanical and industrial goods.

This application is a continuation-in-part of our copending application, Serial Number 170,056 filed June 23, 1950, now abandoned.

While certain representative embodiments and details have been shown for the purpose of illustrating the invention, it will be apparent to those skilled in this art that various changes and modifications may be made therein without departing from the spirit or scope of the invention.

We claim:

1. The processable, storable elastomeric reaction product of (A) a material prepared from bifunctional ingredients including at least one dibasic carboxylic acid containing at least 3 carbon atoms and at least one complementary bifunctional reactant in which the functional groups are selected from the class consisting of the hydroxyl group and the hydrogen-bearing amino groups, the hydrogen-bearing amino groups being present in an amount not to exceed 30% of the total functional groups of said complementary bifunctional reactant, said material having an acid number from 0 to 12 and the sum of the hydroxyl and acid numbers of said material being from 30 to 152, and (B) at least one tolylene diisocyanate used in an amount ranging from 0.85 to 1.10 mols per mol of said material.

2. The processable, storable elastomeric reaction product of (A) a material prepared from bifunctional ingredients including at least one dibasic carboxylic acid containing at least 3 carbon atoms and at least one complementary bifunctional reactant in which the functional groups are selected from the class consisting of the hydroxyl group and the hydrogen-bearing amino groups, the hydrogen-bearing amino groups being present in an amount not to exceed 30% of the total functional groups of said complementary bifunctional reactant, said material having an acid number from 0 to 12 and the sum of the hydroxyl and acid numbers of said material being from 30 to 152, and (B) at least one meta tolylene diisocyanate used in an amount ranging from 0.85 to 1.10 mols per mol of said material.

3. The processable, storable elastomeric reaction product defined by claim 1 in which the complementary bifunctional reactant is a glycol.

4. The processable, storable elastomeric reaction product defined by claim 3 in which (A) is a polyester prepared from adipic acid, ethylene glycol and propylene glycol.

5. The processable, storable elastomeric reaction product defined by claim 4 in which the polyester is prepared from approximately 80 mol percent of ethylene glycol, approximately 20 mol percent of propylene glycol, and adipic acid.

6. The processable, storable elastomeric reaction product defined by claim 5 in which the polyester has an acid number from 0 to 12 and a hydroxyl number such that the sum of the acid number and hydroxyl number is from 50 to 65, and in which the diisocyanate is used in an amount ranging from 0.90 to 1.00 mol per mol of polyester.

7. The processable, storable elastomeric reaction product defined by claim 1 in which the diisocyanate is used in an amount ranging from 0.90 to 1.00 mol per mol of said material.

8. The processable, storable elastomeric reaction product defined by claim 7 in which the diisocyanate is used in an amount ranging from 0.94 to 1.00 mol per mol of said material.

9. The processable, storable elastomeric reaction product defined by claim 1 in which (A) is prepared from azelaic acid.

10. The process for making a processable, storable elastomeric reaction product which comprises reacting (A) a material prepared from bifunctional ingredients including at least one dibasic carboxylic acid containing at least 3 carbon atoms and at least one complementary bifunctional reactant in which the functional groups are selected from the class consisting of the hydroxyl group and the hydrogen-bearing amino groups, the hydrogen-bearing amino groups being present in an amount not to exceed 30% of the total functional groups of said complementary bifunctional reactant, said material having an acid number from 0 to 12 and the sum of the hydroxyl and acid numbers of said material being from 30 to 152 with (B) at least one tolylene diisocyanate used in an amount ranging from 0.85 to 1.10 mols per mol of said material.

11. The process defined by claim 10 in which the complementary bifunctional reactant is a glycol.

12. The process defined by claim 11 in which (A) is a polyester prepared from ethylene glycol, propylene glycol, and adipic acid.

13. The process defined by claim 12 in which the polyester has an acid number from 0 to 12 and a hydroxyl number such that the sum of the acid number and hydroxyl number is from 50 to 65, and in which the diisocyanate is used in an amount ranging from 0.90 to 1.00 mol per mol of polyester.

14. The process defined by claim 10 in which the diisocyanate is used in an amount ranging from 0.90 to 1.00 mol per mol of said material.

15. The process defined by claim 14 in which the diisocyanate is used in an amount ranging from 0.94 to 1.00 mol per mol of said material.

16. The process for making a cured elastomeric composition which comprises reacting the product prepared according to the process defined by claim 10 with a sufficient amount of at least one polyisocyanate to bring the total number of —NCO equivalents used in the preparation of said cured composition to from 2.80 to 3.20 equivalents of —NCO per mol of said material.

17. The process for making a cured elastomeric diisocyanate-modified material which comprises reacting the product prepared according to the process defined by claim 14 with a sufficient amount of at least one polyisocyanate to bring the total number of —NCO equivalents used in the preparation of said cured composition to from 2.8 to 3.20 equivalents per mol of said material.

18. The process for making a cured elastomeric diisocyanate-modified polyester which comprises reacting the reaction product prepared according to the process defined by claim 15 with a sufficient amount of at least one polyisocyanate to bring the total number of —NCO equivalents reacted with the polyester to from 2.8 to 3.2 equivalents per mol of polyester.

References Cited in the file of this patent

UNITED STATES PATENTS

| | | |
|---|---|---|
| 2,621,166 | Schmidt et al. | Dec. 9, 1952 |
| 2,625,531 | Seeger | Jan. 13, 1953 |
| 2,625,532 | Seeger | Jan. 13, 1953 |